(12) United States Patent
Schwertfeger

(10) Patent No.: US 6,210,751 B1
(45) Date of Patent: *Apr. 3, 2001

(54) PROCESS FOR PREPARING ORGANICALLY MODIFIED AEROGELS IN WHICH THE SALTS FORMED ARE PRECIPITATED OUT

(75) Inventor: Fritz Schwertfeger, Frankfurt (DE)

(73) Assignee: Cabot Corporation, Billerica, MA (US)

(*) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/068,371

(22) PCT Filed: Nov. 5, 1996

(86) PCT No.: PCT/EP96/04822

§ 371 Date: Aug. 24, 1998

§ 102(e) Date: Aug. 24, 1998

(87) PCT Pub. No.: WO97/17288

PCT Pub. Date: May 15, 1997

(30) Foreign Application Priority Data

Nov. 9, 1995 (DE) .............................................. 195 41 715

(51) Int. Cl.$^7$ ..................................................... B05D 7/00
(52) U.S. Cl. .......................... 427/219; 427/212; 427/215; 516/81; 516/82; 516/85
(58) Field of Search ................................. 516/81, 82, 85; 427/212, 215, 219

(56) References Cited

U.S. PATENT DOCUMENTS

| | | | |
|---|---|---|---|
| 2,285,477 | * | 6/1942 | White ..................... 252/313 |
| 2,927,083 | * | 3/1960 | Nickerson ............... 252/317 |
| 5,795,556 | * | 8/1998 | Jansen et al. ........... 423/338 |
| 5,866,027 | * | 2/1999 | Frank et al. ............. 252/62 |

FOREIGN PATENT DOCUMENTS

| | | | |
|---|---|---|---|
| 3346180 A1 | 8/1985 | (DE) . | |
| 0658513 A1 | 6/1995 | (EP) . | |
| 0 658 513 A1 | * 6/1995 | (EP) ............... | C01B/33/16 |
| WO 96/06809 | * 3/1996 | (WO) .............. | C04B/30/02 |

* cited by examiner

*Primary Examiner*—Shrive Beck
*Assistant Examiner*—Paul D. Strain
(74) *Attorney, Agent, or Firm*—Frommer Lawrence & Haug LLP

(57) ABSTRACT

The present invention relates to a process for the preparation of organically modified aerogels, comprising a) the preparation of a silicic acid sol having a pH of $\leq 4.0$ from an aqueous water glass solution, with the aid of at least one organic and/or inorganic acid;

b) polycondensation of the resulting silicic acid sol to a $SiO_2$ gel by the addition of a base;

c) washing the gel obtained in Step b) with an organic solvent until the water content of the gel is $\leq 5\%$ by weight;

d) surface-silylating the gel obtained in Step c), and e) drying the surface-silylated gel obtained in Step d), characterized in that at least one acid forms difficultly soluble salts with the cations of the water glass in the silicic acid sol, and that before Step b) the resulting difficultly soluble salts are extensively precipitated and separated from the silicic acid sol.

11 Claims, No Drawings

PROCESS FOR PREPARING ORGANICALLY MODIFIED AEROGELS IN WHICH THE SALTS FORMED ARE PRECIPITATED OUT

The present invention relates to a process for the preparation of organically modified $SiO_2$ aerogels, in which process the salts formed are precipitated.

Aerogels, particularly those having porosities over 60% and densities below 0.6 g/cm$^3$ have an extremely low thermal conductivity and for this reason are used as thermal insulating materials, as described e.g. in EP-A-0 171 722.

Aerogels in the broader sense of the term, i.e. in the sense of a "gel with air as dispersing agent," are prepared by drying a suitable gel. Understood by the term "aerogel" in this sense are aerogels considered in the narrower sense, xerogels and cryogels. A dried gel is considered an aerogel in the narrower sense of the term when the liquid of the gel is removed at temperatures above the critical temperature and starting from pressures above the critical pressure. However, if the liquid of the gel is removed under subcritical conditions, e.g. with the formation of a liquid-vapor boundary phase, then the resulting gel is designated as a xerogel. It should be noted that the gels according to the invention are aerogels in the sense of gels with air as dispersing agent.

$SO_2$ aerogels can be prepared e.g. by acid hydrolysis of tetraethyl orthosilicate in ethanol. During the hydrolysis a gel is formed whose structure is determined, among other things, by the temperature, the pH and the duration of the gelation process. However, during the drying of the wet gels, the gel structure generally collapses because the capillary forces resulting during drying are extremely great. Collapse of the gel can be prevented by carrying out the drying above the critical temperature and critical pressure of the solvent. Since in this range the liquid/gas phase boundary disappears, the capillary forces also vanish and the gel does not change during the drying process, i.e. no shrinking of the gel will occur during the drying, either. Methods of preparation based on this drying technology are disclosed e.g. in EP-A-0 396 076 and WO 92/03378. However, e.g. when ethanol is used, this technique requires a temperature of about 240° C. and pressures over 60 bar. Although the exchange of ethanol against $CO_2$ before drying does reduce the drying temperature to about 30° C., the pressure required is then over 70 bar.

An alternative to the above drying method is offered by a process of subcritical drying of $SiO_2$ gels, if, before drying, the latter are reacted with a chlorine-containing silylating agent. In that case the $SiO_2$ gel can be obtained e.g. by acid hydrolysis of tetraalkoxysilanes, preferably tetraethoxysilane (TEOS) in a suitable organic solvent, preferably ethanol, by means of water. In a further step, after exchange of the solvent against a suitable organic solvent, the resulting gel is reacted with a chlorine-containing silylating agent. Used as silylating agents, because of their reactivity, are preferably methylchlorosilanes ($Me_{4-n}SiCl_n$, with n=1 to 3). Thereupon the resulting $SiO_2$ gel whose surface has been modified by methylsilyl groups, can be dried in air from an organic solvent. In this way aerogels having densities of less than 0.4 g/cm$^3$ and porosities over 60% can be obtained.

WO 94/25149 gives a detailed description of the method of preparation based on this drying technique.

Furthermore, before drying, the above-described gels can be treated in the aqueous alcoholic solution with tetraalkoxysilanes, and then aged, in order to increase the strength of the gel network, as disclosed e.g. in WO 92/20623.

However, the tetraalkoxysilanes used as starting materials in the above-described process are extremely expensive.

A first, not inconsiderable cost reduction can be achieved by using water glass as the starting material for the preparation of the $SiO_2$ gels. To this end, a silicic acid can be prepared, e.g., from an aqueous water glass solution with the aid of an ion exchanger resin, which acid will polycondense to a $SiO_2$ gel upon the addition of a base. Then in a further step, after exchange of the aqueous medium against a suitable organic solvent, the resulting gel is reacted with a chlorine-containing silylating agent. Used as silylating agents, because of their reactivity, are again preferably methylchlorosilanes ($Me_{4-n}SiCl_n$ with n=1 to 3). The resulting $SiO_2$ gel surface-modified with methylsilyl groups can then also be dried in air from an organic solvent. The method of preparation based on this technique is described e.g. in DE-A-43 42 548.

An unsolved problem consists in the aqueous salt solutions which are obtained in the preparation of aerogels from water glass. In order to convert a water glass solution into a silicic acid sol capable of condensation, the cations (mostly sodium and/or potassium ions) must be exchanged in the water glass solution against protons. For this purpose, organic and/or inorganic acids may be used. The salts of the above-mentioned cations (e.g. NaCl or $Na_2SO_4$) which will also necessarily be formed in the dissolved state must be washed out from the gel before, during or after gel aging. At present, these highly dilute aqueous salt solutions constitute a great disposal problem, because they can no longer be discharged into rivers or lakes in relatively large quantities. A final disposal of these solutions which meets current regulations represents an extremely high cost factor. The preparation of a silica sol from water glass and sulfuric acid, and crystallization and separation of the resulting sodium sulfate by cooling the reaction mixture is known from U.S. Pat. No. 2,285,477.

The object of the present invention was to provide a process for the preparation of organically modified $SiO_2$ aerogels in which no dilute aqueous salt solutions will be formed.

This object is met by a process for the preparation of organically modified aerogels, comprising a) the preparation of a silicic acid sol having a pH of $\leq 4.0$ from an aqueous water solution, with the aid of at least one organic and/or inorganic acid;

b) polycondensation of the resulting silicic acid sol to a $SiO_2$ gel by the addition of a base;

c) washing the gel obtained in Step b) with an organic solvent until the water content of the gel is $\leq 5\%$ by weight;

d) surface-silylating the gel obtained in Step c), and e) drying the surface-modified gel obtained in Step d), characterized in that the salts formed from the acid and the cations of the water glass are extensively precipitated before Step b) at temperatures of 0 to 30° C. and separated from the silicic acid sol.

Used as water glass solution in Step a) is generally a 6 to 25% by weight (calculated on the $SiO_2$ content) sodium and/or potassium water glass solution. A 17 to 20% by weight water glass solution is preferred. Furthermore, the water glass solution may also contain up to 90% by weight (calculated on $SiO_2$) of zirconium, aluminum and/or titanium compounds capable of condensation.

The acids used are generally 15 to 50% by weight acids, which form difficultly soluble salts with sodium and/or potassium ions. Mixtures of suitable acids can also be used. Sulfuric, phosphoric, hydrofluoric and oxalic acid are preferred. Sulfuric acid is especially preferred.

To achieve an as complete precipitation and good separation of the difficultly soluble salts formed in Step a) as possible, the silicic acid sol should have a temperature between 0 and 30° C., preferably between 0 and 15° C., and by particular preference between 0 and 5° C. This can be achieved by bringing the water glass solution, the acid and/or the silicic acid sol to a temperature between 0 and 30° C., preferably between 0 and 15° C., and by particular preference between 0 and 5° C. If, in so doing, a supersaturated salt solution should form, the salt can be precipitated by suitable seeding with appropriate seeding crystals. The salts formed are separated by means known to persons skilled in the art, e.g. by filtration, sintering, suction filtration, membranes or crystallization vessels. Semi-continuous or continuous processes are preferred.

After the salts have been separated off, the silicic acid sol is adjusted with water to a concentration of between 5 and 12% (calculated on the $SiO_2$ content). A 6 to 9% by weight silicic acid solution is particularly preferred.

The polycondensation of the substantially salt-free silicic acid sol obtained in Step a) to form a $SiO_2$ gel takes place in Step b) by the addition of a base in a pH region of between 3.0 and 7.0, preferably between 4.0 and 6.0. Used as base is generally $NH_4OH$, NaOH, KOH, $Al(OH)_3$, colloidal silica and/or an alkaline water glass solution. $NH_4OH$, NaOH and KOH are preferred, with NaOH especially preferred. However, mixtures of the aforementioned can also be used.

Step b) is generally carried out at a temperature between the freezing point of the solution and 100° C. Optionally, a shaping step, such as spray forming, extrusion or drop formation can simultaneously be carried out.

Before Step c) the gel is preferably aged, an operation generally carried out at 40 to 100° C., preferably at 80 to 100° C., and at a pH of 4 to 11, preferably 5 to 7. The duration of this operation is generally 1 second to 12 hours, preferably 1 second to 5 hours.

Optionally, the aged hydrogel can be washed with water until it is free of electrolytes.

In Step c), the gel obtained in Step b) is washed with an organic solvent until the water content of the gel is ≦5% by weight, preferably ≦2% by weight, and by particular preference ≦1% by weight. Used as solvents are generally aliphatic alcohols, ethers, esters or ketones, as well as aliphatic or aromatic hydrocarbons. Preferred solvents are methanol, ethanol, acetone, tetrahydrofuran, ethyl acetate, dioxane, n-hexane and toluene. A particularly preferred solvent is acetone. However, mixtures of the aforementioned solvents can also be used. Furthermore, the water can first be washed out with a water-miscible alcohol, and the latter can then be washed out with a hydrocarbon.

In Step d) the solvent-containing gel is reacted with a silylating agent. Suitable as silylating agents are generally silanes of formulas $R^1_{4-n}SiCl_n$ or $R^1_{4-n}Si(OR^2)_n$ (with n=1 to 3), where $R^1$ and $R^2$, independently of one another, are $C_1$–$C_6$-alkyl, cyclohexyl or phenyl. Isopropenoxysilanes and silazanes are also suitable. Trimethylchlorosilane is preferably used. Furthermore, all silylating agents known to persons skilled in the art may be employed, e.g. even those disclosed in DE-A-44 30 669. The reaction is generally carried out at 20 to 100° C., preferably at 30 to 70° C., and in a solvent if necessary. Optionally, the silylation may be accelerated by a catalyst, e.g. an acid or base.

Before Step e) the silylated gel is preferably washed with a protic or aprotic solvent, until unreacted silylating agent has been substantially removed (residual content ≦1% by weight). Solvents suitable for this purpose have been mentioned in Step c). Similarly, the solvents cited there as being preferred are preferred also in this case.

In Step e) the silylated and preferably after-washed gel is preferably dried under subcritical conditions, by particular preference at temperatures of from −30° C. to 200° C., and particularly at 0 to 100° C. The pressures used during the drying are preferably between 0.001 and 20 bar, and by particular preference between 0.01 and 5 bar.

The gel obtained in Step d) can also be dried under supercritical conditions. Depending on the solvent used, this requires temperatures higher than 200° C. and/or pressures higher than 20 bar. This is readily possible, but is associated with an increased cost and affords no significant advantages.

The drying is generally continued until the gel has a residual solvent content of less than 0.1% by weight.

In another embodiment the gel may, after the shaping polycondensation in Step b) and/or any subsequent step, be comminuted by techniques known to persons skilled in the art, e.g. by grinding.

Furthermore, in order to reduce the contribution of radiation to thermal conductivity, IR-opacifying agents such as carbon black, titanium dioxide, iron oxides and/or zirconium dioxide may be added to the sol before gel preparation.

Furthermore, it is possible to add to the sol fibers before preparation of the gel, in order to increase its mechanical stability. Suitable for use as fiber materials are inorganic fibers such as glass fibers or mineral fibers, organic fibers such as polyester fibers, aramide fibers, Nylon fibers or fibers of vegetable origin, as well as mixtures thereof. The fibers may also be coated, e.g. polyester fibers metallized with a metal such as aluminum.

Below, the process according to the invention is described in greater detail by means of an embodiment, without thereby limiting said process in any way.

EXAMPLE 1

To 236 g of 25% $H_2SO_4$ cooled to 0° C. is dropwise treated, under continuous cooling to 0° C., with 707 g of a sodium water glass solution cooled to 7° C. (containing 17% by weight of $SiO_2$ and a $Na_2O:SiO_2$ ratio of 1:3.3). A pH of 1.6 is obtained. The precipitating $Na_2SO_4 \cdot 10H_2O$ is separated at 0° C. from the silicic acid sol by suction filtration, and the silicic acid sol is diluted with 280 mL of $H_2O$.

The resulting silicic acid sol is treated at 5° C. and under stirring with 26 mL of a 1 N NaOH solution, to bring the pH to 4.7. The resulting hydrogel is then aged for 2.5 hours at 85° C.

The modulus of elasticity of the aged hydrogel is 15.5 MPa. It is washed with 2 L of warm water and then extracted with acetone, until the water content of the gel is below 1% by weight. The acetone-containing gel is then silylated with 5% by weight of trimethylchlorosilane (TMCS) for 3 hours at 50° C. and washed with 2 L of acetone. The gel is dried in air (3 hours at 40° C., then 2 hours at 50° C. and 12 hours at 150° C.).

The resulting transparent aerogel has a density of 0.15 g/cm³. Its specific surface area according to BET is 500 m²/g. The λ value is 0.020 W/mK.

The thermal conductivity was measured by a hot wire method (see e.g. O. Nielsson, G. Rüschenpöhler, J. Gross and J. Fricke, High Temperatures—High Pressures, Vol. 21, 267–274 (1989)).

What is claimed is:

1. Process for the preparation of modified aerogels, consisting of,
   a) preparing a silicic acid sol having a pH of ≦4.0 from an aqueous water glass solution, with the aid of at least one organic and/or inorganic acid, optionally adding IR opacifying agents and/or fibers to the sol;

b) polycondensing the resulting silicic acid sol to a SiO$_2$ gel by the addition of a base, optionally followed by aging the gel;

c) washing the gel obtained in Step b) with an organic solvent until the water content of the gel is ≦5% by weight;

d) surface-silylating the gel obtained in Step c); and e) drying the surface-silylated gel obtained in Step d), characterized in that the salts formed from the acid and the cations of the water glass are extensively precipitated before Step b) at temperatures of 0 to 30° C. and separated from the silicic acid sol.

2. Process according to claim 1, characterized in that the water glass solution used in Step a) is a 6 to 25% by weight sodium and/or potassium water glass solution.

3. Process according to claim 1, characterized in that said water glass solution contains up to 90% by weight, calculated on SiO$_2$ or zirconium, aluminum and of titanium compounds capable of condensation.

4. Process according to claim 1, characterized in that 15 to 50% by weight sulfuric acid is used as acid.

5. Process according to claim 1, characterized in that the base used in Step b) is NaOH, NH$_4$OH, KOH, Al(OH)$_3$, colloidal silica and/or an alkaline water glass solution.

6. Process according to claim 1, characterized in that, the gel is aged at 40 to 100° C. at a pH of 4 to 11 for a period between 1 second and 12 hours.

7. Process according to claim 1, characterized in that the solvents used in Step c) are aliphatic alcohols, ethers, esters, ketones, aliphatic or aromatic hydrocarbons.

8. Process according to claim 1, characterized by using as silylating agents silanes having the formulas $R^1_{4-n}SiCl_n$ or $R^1_{4-n}Si(OR^2)_n$, where n=1 to 3, and $R^1$ and $R^2$, independently of one another, are $C_1$–$C_6$-alkyl, cycloalkyl or phenyl.

9. Process according to claim 1, characterized in that before Step e) the silylated gel is washed with a protic or aprotic solvent.

10. Process according to claim 1, characterized in that the gel is dried in Step e) under subcritical conditions.

11. Process according to claim 1, characterized in that before the gel preparation, infrared opacifying agents and/or fibers are added to the sol.

* * * * *